(12) United States Patent
Loce et al.

(10) Patent No.: US 7,227,669 B2
(45) Date of Patent: Jun. 5, 2007

(54) METHOD OF SELECTIVE EDGE SOFTENING AND RENDERING FOR THE SUPPRESSION OF HALO

(75) Inventors: Robert P. Loce, Webster, NY (US); Clara Cuciurean-Zapan, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 107 days.

(21) Appl. No.: 10/985,133

(22) Filed: Nov. 10, 2004

(65) Prior Publication Data

US 2005/0062995 A1 Mar. 24, 2005

Related U.S. Application Data

(62) Division of application No. 09/455,343, filed on Dec. 6, 1999.

(51) Int. Cl.
*H04N 1/405* (2006.01)

(52) U.S. Cl. ........................ 358/3.14; 358/2.1

(58) Field of Classification Search ................ 358/1.9, 358/2.1, 3.03–3.06, 3.13–3.14, 3.2, 3.24, 358/3.15; 382/260–275, 257
See application file for complete search history.

(56) References Cited

U.S. PATENT DOCUMENTS

| | | | |
|---|---|---|---|
| 4,791,679 A | 12/1988 | Barski et al. | 382/55 |
| 5,218,350 A | 6/1993 | Bollman | 340/723 |
| 5,483,351 A | 1/1996 | Mailloux et al. | 358/298 |
| 5,835,238 A | 11/1998 | Mantell | 358/458 |
| 5,847,712 A | 12/1998 | Salesin et al. | 345/430 |
| 6,271,936 B1 * | 8/2001 | Yu et al. | 358/3.04 |
| 6,340,990 B1 * | 1/2002 | Wilson | 348/448 |

OTHER PUBLICATIONS

U.S. Appl. No. 09/362,021 entitled "Non-Printing Patterns for Improving Print Quality" by Robert J. Meyer and Allen T. Retzlaff.
U.S. Appl. No. 09/362,022 entitled "Improved Digital Halftone With Auxiliary Pixels" by Robert J. Meyer and Allen T. Retzlaff, Jr.
U.S. Appl. No. 09/362,020 entitled "Improved Font Print Quality with Auxiliary Pixels" by Robert J. Meyer and Allen T. Retzlaff, Jr.
U.S. Appl. No. 09/389,271 entitled "Fringe Field Tailoring with Sub-pixel Patterns for Improved Print Quality" by Lofti Belkhir.
U.S. Appl. No. 09/176,969 entitled "Method For Automatic Trap Selection For Correcting For Separation Misregistration In Color Printing" by R. Victor Klassen.

* cited by examiner

*Primary Examiner*—Thomas D. Lee
*Assistant Examiner*—Stephen Brinich
(74) *Attorney, Agent, or Firm*—Christopher D. Wait

(57) ABSTRACT

Selective edge softening and selective edge dithering is introduced into an image representation to improve local control where halo problems are expected. Selective areas of dilation are isolated and separately dithered or halftoned, the result of which is then swapped back into or substituted for the stored original image. In this manner misregistration and color plane-to-plane interactions can be compensated for in plural image forming station architecture systems. The same technique is also valuable in monochrome systems as an aid to overcoming edge displacement and slow toner problems when the selective edge softening is selectively applied to edges which are in particular perpendicular to the fast scan direction.

10 Claims, 3 Drawing Sheets

METHOD OF SELECTIVE EDGE SOFTENING AND RENDERING FOR THE SUPPRESSION OF HALO

CROSS-REFERENCE TO RELATED APPLICATIONS

This is a divisional of U.S. application Ser. No. 09/455,343; filed Dec. 6, 1999 by the same inventor, and claims priority therefrom.

Cross reference is made to the following applications incorporated by reference herein: U.S. patent application Ser. No. 09/362,021 entitled "Non-Printing Patterns for Improving Print Quality" by Robert J. Meyer and Allen T. Retzlaff, Jr.; U.S. patent application Ser. No. 09/362,022 entitled "Improved Digital Halftone With Auxiliary Pixels" by Robert J. Meyer and Allen T. Retzlaff, Jr.; U.S. patent application Ser. No. 09/362,020 entitled "Improved Font Print Quality with Auxiliary Pixels" by Robert J. Meyer and Allen T. Retzlaff, Jr.; U.S. patent application Ser. No. 09/389,271 entitled "Fringe Field Tailoring with Sub-pixel Patterns for Improved Print Quality" by Lofti Belkhir; U.S. patent application Ser. No. 09/176,969 entitled "Method For Automatic Trap Selection For Correcting For Separation Misregistration In Color Printing" by R. Victor Klassen.

BACKGROUND OF THE INVENTION AND MATERIAL DISCLOSURE STATEMENT

The present invention relates to improving images produced by electrostatographic printers and copiers and more particularly, concerns solving the image problems of edge delineation, and leading edge deletion in an image. Such leading edge deletion and placement problems may manifest as phenomena typically referred to as line shrinkage, halo and white gap artifacts. These artifacts are also sometimes referred to as "slow toner".

In a typical electrophotographic printing machine, a photoreceptor is charged and exposed to record an electrostatic latent image therein. The photoreceptor is advanced to a development station where toner is deposited on the latent image. It has been found that when a toner powder cloud development system is used, large amounts of toner are deposited where there is an uninterrupted expanse of charged area (such as toward the middle of large image shapes), and toner is starved from locations where there is a strong or sudden change in charge (as found with narrow lines or shapes and on the edges of larger shapes). The result is edge displacement. The effect on large shapes causes them to exhibit a defect called halo, which manifests itself most clearly at the interfaces of solid colors. Halo in color systems appears as white lines at interfaces which should otherwise be a perfect match between two colors.

However, there are other sources of halo defects. These include misregistration and color plane-to-plane interactions, particularly on edges as found in plural image forming station architecture systems. One example of a plural image forming station architecture is an image-on-image (IOI) system in which the photoreceptive member is recharged, reimaged and developed for each color separation, followed by a single transfer of all colors to paper. Any misregistration of the imaging or development of the photoreceptive member will cause halo. Also, color plane-to-plane problems may occur where a prior developed color toner inhibits the development of a subsequent color toner. These various defects are also observable in single color images as edge distortion or displacement and line shrinkage dependent on the size of the printed object. Line shrinkage of course leads to poor line and text quality due to an erosion or shrinkage of the line edges and corners. Various approaches have been devised to solve these halo and slow toner effects.

The following patents appear to be relevant to edge dilation and the enhancement of the edge of image shapes.

In U.S. Pat. No. 4,791,679, Image Character Enhancement Using A Stroke Strengthening Kernal, to Barski, et al., a character stroke is strengthened by processing video image data with a 16×16 kernal, and moving the kernal one pixel at a time through the image. For each pixel position, sections of the kernal, are selectively filled with black pixels in proportion to the number of black pixels in each section, in accordance with a set of predetermined rules.

U.S. Pat. No. 5,483,351, Dilation Of Images Without Resolution Conversion To Compensate For Printer Characteristics, to Mailloux, et al., discloses an image compensation system which provides dilation or erosion of image features using halfbitting or fullbitting in the rendition of bitmap images, especially on a write-white printer. A region of pixels of an image is isolated which includes two or more correctable pixel locations. A set of state determination rules, based on the formation of pixels in the isolated region, is used to determine a corrected binary pixel state for each of the correctable pixels. Corrections for one correctable pixel may be considered in the state determination rules for adjacent correctable pixels. A single enhanced output pixel is provided for each image input pixel, thereby preserving the original image resolution. Performing enhancements on multiple input pixels simultaneously increases the system throughput.

In U.S. Pat. No. 5,218,350, Image Processing Method For Dodging With Softened Edge Transitions, to Bollman, incorporated by reference herein for its teaching, image appearance characteristics for a display may be defined by two data sets, a first standard data set for the image, and a second set for the area to be dodged, where the dodged area is separated from the remainder of the image by a series of edges. The appearance of any particular pixel in the original is determined by the first bit, or control plane, of the image data, the state of which indicates that pixel appearance is determined by one of the first or second data sets. To soften the transition of the image from one data set to another data set, at the dodged area edges, a filter function is applied to the control plane values, acting on areas adjacent the edge, to create a distribution of control plane values over an area adjacent to the edge. Error diffusion, or dithering of the filtered values, is then applied to quantize intermediate values generated by the filter function to legal values giving the illusion that the edge changes gradually from the first data set to the second data set, thereby creating a softened edge effect, using only a single control bit in the image data.

Therefore, a need exists for techniques which will solve these halo and slow toner effects. Further, there exists a demand for increasing the through-put of printing and digital imaging systems without incurring or exacerbating these problems. Thus, it would be desirable to satisfy such needs or demands by solving the aforesaid and other deficiencies and disadvantages.

SUMMARY OF THE INVENTION

The present invention relates to a method for eliminating halo defects in a print image. The method comprises receiving and storing print image data which is then selectively dilated. The areas of selective dilation are isolated and then halftoned.

Another aspect of the present invention relates a method for improving the printing of an image by receiving a source image of original pixel data and performing a trapping operation on that original pixel data. The data identified by the trapping step is tagged as a part of that operation. The data tagged in the trapping step is then dithered.

In still another aspect of the present invention, there is provided a digital imaging system which receives and processes a document image, in an image processing system. The document image shape edges are selectively softened in order to improve the rendition of the document image.

DESCRIPTION OF THE INVENTION

Figures 1, 2:
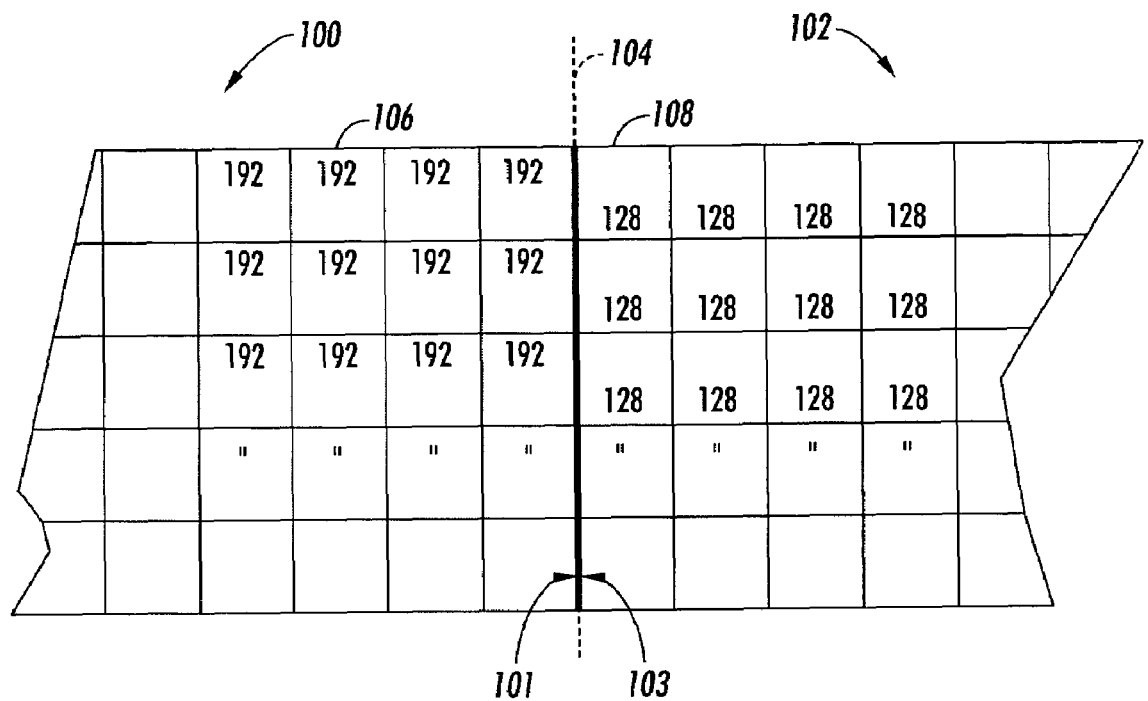
FIG. 1 is a depiction of two shapes located directly adjacent to each other.
FIG. 2 is the shapes from FIG. 1 as dilated and thereby intersecting with each other.

For a general understanding of the present invention, reference is made to the drawings. In the drawings, like reference numerals have been used throughout to designate identical elements. In describing the present invention, the following term(s) have been used in the description.

An "image" is a pattern of physical light. It is understood that an image may be further comprised of shapes. An image as such, may include characters, words, and text as well as other features such as graphics. An image may be divided into "segments" or "regions", each of which is itself an image. A region of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image. An item of data can also be an instruction or parameter that define a feature within an image. Such a form is employed in a image description language form of an image.

Each location in an image may be called a "pixel." A "pixel" is the smallest segment of an image whose value is indicated in an item of data defining the image. In an array defining an image in which each item of data provides a value, each value indicating the color of a location may be called a "pixel value". Each pixel value is a bit in a "binary form" of an image, a gray-scale value in a "gray-scale form" of an image, or a set of color space coordinates in a "color form" of an image, the binary form, gray-scale form, and color form each being a two-dimensional array defining an image.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

In the present context, "rendering" will refer to generating a value of the state of a pixel which is suitable for use in a imaging device. An example of rendering is halftoning, where gray-scale values may be compared to threshold values whereupon they will be converted to a binary number that may used to drive an image writing device, such as a laser scanner. "Dither" and "halftoning" may be used synonymously, although "dithering" is sometimes used in the art to denote a random type of halftoning.

Turning to FIG. 1, depicted is a region of an image where two shapes 100 and 102 are found coincident on an edge. In a preferred embodiment shapes 100 and 102 are different colors, but they may be mono-chromatic. Shape 100 having an edge 101 abuts shape 102 having an edge 103 as found at marker line 104 (provided as a place holder to aid explanation only). In FIG. 1, edge 101 and 103 and marker line 104 are all coincident. Shapes 100 and 102 comprise pixels which typically have uniform gray-scale values assigned. For the example depicted in FIG. 1, shape 100 is of a uniform grayscale and each pixel is assigned a value of 192. Similarly, shape 102 is also of a uniform gray-scale but each pixel has a value of 128.

Shapes 100 and 102 being coincident are susceptible to halo problems. It has been found that combinations of selective softening and selective rendering of abutting shape edges will reduce halo artifacts. The edge softening lowers the contrast of an edge gray-scale transition and is typically accomplished using low pass filtering, averaging operations or look-up tables. Rendering is accomplished utilizing spatial dithering or halftoning as locally applied to those edges most expected to succumb to halo type image defects. Identifying the edges for softening and rendering is accomplished with an image processing technique known as a conditional dilation. This is also called trapping in the document printing industry. Solving halo problems may require selective softening, selective rendering, or both methods applied to an image.

An operation performs "image processing" when it operates on an item of data that relates to part of an image. A "morphological" or "logic-based" operation operates using logical operators (e.g., AND, OR, XOR, INV, NOT) applied to a digital image. In particular, the logic operations are typically applied in association with a "structuring element" such as a closed curve or closed polygon having a predefined shape or other set of characteristics. "Dilation" is a morphological operation wherein a given pixel in the source image being ON causes the SE to be written into the destination image with the SE center at the corresponding location in the destination image. "Erosion" is a morphological operation where a given pixel in the destination image is turned ON if and only if the result of superimposing the SE center on the corresponding pixel location in the source image results in a match between all ON pixels in the SE and ON pixels in the underlying pixels in the source image.

FIG. 2 shows a possible result to the data in FIG. 1 after dilation. Shapes 100 and 102 have been dilated and softened, which results in the moving of their respective edges 101 and 103, some number of pixel locations outward relative to the center of their respective shapes, and introducing new pixel values to give the edge a preferred magnitude and gradient of values. In a preferred embodiment, the dilation is selective. Selective dilation here is the same as conditional dilation but has wider meaning and applicability. To explain selective dilation we must first discuss what conditional dilation is. In the art, conditional dilation is applied where the dilated result would lie within a predefined set. In the present case, a neighboring edge would be that predefined object. This means typically that only the shape edges which are touching or coincident with the edge of another shape edge are morphologically dilated. The dilation is performed only on that part of the edge which is touching another shape edge. Shape edges which do not touch another shape will not be dilated. However, for the purposes of this invention, selective dilation equates to conditional dilation, but is intended to further include the dilation of those shape edges which are only perpendicular to the fast scan direction, or in the alternative only perpendicular to the slow scan direction of an imaging marking process.

The selective dilation may also be included in the same operation as selective softening. Selective softening is the modification of pixel gray values to be values other than those found in the pixel edge. The resulting edge values may be the same as the previous edge values, be of a lowered value, higher value, or possess a gradient. They may also employ a gradient to a static lower (or higher) value i.e. plateau, or any other combination of the above. In the application of halo suppression in a preferred embodiment image-on-image marking process it has been found that edge values that possess a slight gradient to a lower value are preferred, thereby generating a "softer" appearing edge. However, the present invention is not limited to the softening of an edge, and certain marking and viewing processes may require a sharpening. We will refer to the modification of the edge values simply as softening.

As may be observed with regard to marker line 104, edge 101 has been moved one pixel in the morphological dilation of shape 100. Alternatively, edge 103 has been shifted two pixel locations by the selective dilation of shape 102. The amount of dilation will vary depending upon the particular system the invention is to be applied to and will ultimately be empirically based. One to eight pixel locations is considered typical in a preferred embodiment. The amount of dilation may also vary as with regards to edge orientation. For example vertical edges or edges perpendicular to the fast scan direction may ideally receive less, or more, or even no dilation than horizontal edges or edges perpendicular to the slow scan direction.

It is the area of selective dilation which is the focus for treatment in this invention. This area of dilation is the region between marker line 104 and the edges 101 and 103 as found in FIG. 2 after the morphological dilation of their respective shapes, 100 and 102. It is this region which is to receive edge softening and dithering or halftoning. FIG. 2 depicts an edge softening gradient where the grayscale values drop off. Shape 102 grayscale value of 128 drops to 100, then 80, and then 70 as it proceeds into the area of dilation. Shape 100 which has a dilated area only one pixel wide drops from its grayscale of 192 to a value of 170 in the dilation region. There are various approaches to achieving this in the art. In a preferred embodiment the use of LUT (look up tables) is employed to both find an edge and to make the appropriate changes to the area of dilation and the edge data.

In addition to edge softening, there are various dithering techniques that can be employed, including but not limited to white noise, stochastic (blue noise) screen, error diffusion, Bayer's (ordered) dither, or a even similar variant cluster scheme as applied to the rest of the image. In a preferred embodiment, the dithering is a different halftone type at a higher frequency than the halftone which is used by the system as applied to the rest of the image. In this manner the introduction of selective softening and selective dithering of the edges in an image is effected.

Selective edge softening and selective dithering have two main areas of beneficial application: first, monochrome; and second, color systems. For a preferred embodiment, in a monochrome system, the dithered edge softening is applied to shape edges which are perpendicular to the process direction. This has the benefit of softening the fringe fields somewhat, and thus ameliorating slow toner effects like edge displacement and image halo. This effectuates an operation in a manner similar to, though not as directly as, the field tailoring pixels described in U.S. patent application Ser. No. 09/389,271, incorporated by reference above. In a color system preferred embodiment, dithered edge softening is applied selectively to shape edges which abut or contact other shape edges. This may be only done to one color separation, some, or all the color separations (including black). By softening and optimally dithering the edge of a prior developed toner, fringe field strength is reduced and a less optically dense barrier is provided for subsequent exposure. This lessens the suppression of the development of a subsequent toner and thus reduces problems from halo.

Figure 3:
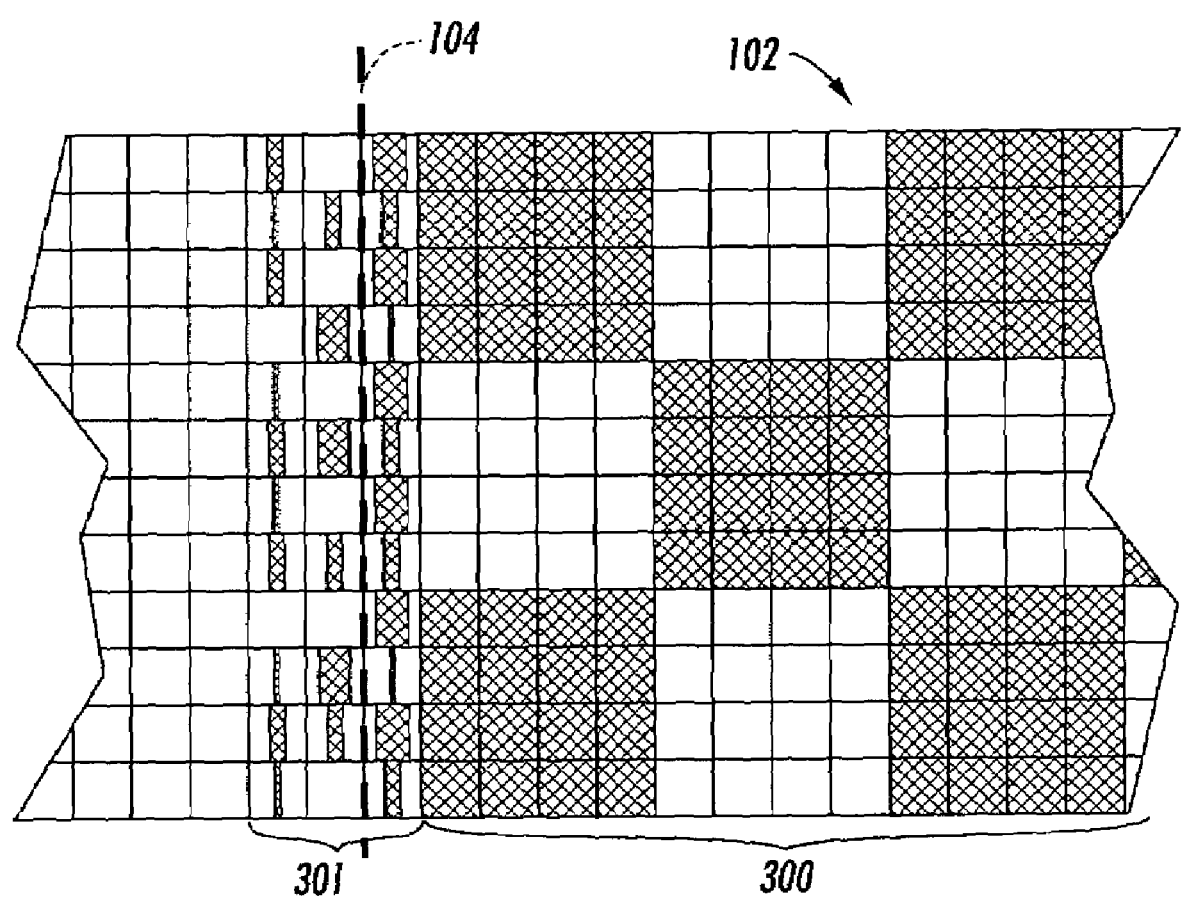
FIG. 3 is a shape from FIG. 2 with halftoning applied.

FIG. 3 depicts an example of the present invention where selective dithering is applied to the shape 102 data as found in FIG. 2. Marker line 104 indicates the location of the original shape edge as in the figure before. Shape 102 is shown alone here for clarity. FIG. 3 depicts shape 102 as pulse width modulation (PWM) data. The shape 102 is now made up of two regions as a result of the present invention. Region 300 represents the main body of shape 102 and has a typical system halftone applied to it. Region 301 however, has been dithered with a halftone of much higher frequency as per a preferred embodiment of the invention. Pulse width position modulation (PWPM) may be employed in a preferred embodiment to accomplish this. PWPM techniques are well know in the art. U.S. Pat. No. 5,184,226 and U.S. Pat. No. 5,504,462, which are both incorporated by reference herein for their teaching, provide exemplary examples.

Region 301 of shape 102 in this preferred embodiment depicted in FIG. 3 represents more than just dithered treatment of a dilated region. Examining marker line 104 we see that it also includes a one pixel wide area inside the original edge of the shape 102, an area captured by erosion. This figure shows how edge softening can begin within a shape 102 as well as without that shape as discussed above. This is achieved via a selective erosion of a copy of the original data. The eroded copy is subtracted from a copy of the original to yield just the areas of selective erosion. These areas of selective erosion are combined with the areas of selective dilation for dithering. The result of that operation is XOR with the original data after it has been halftoned. It is a composite of that result which is depicted in FIG. 3.

Much of what is discussed above is provided in a further color example below, but restated in the parlance/symbolic vernacular typical to the art, where:

K=black
C=Cyan
⊕=dilate
∩=intersection (logical AND)
∪=union (logical OR)
*=convolution
Δ=symmetric difference (logical XOR)

a methodology comprising:

1. Using solid area K (black) and C (Cyan) separations as an example (currently worst case in a preferred embodiment image-on-image system), dilate C by some shape $B_1$ $C_D=(C \oplus B_1)$ $B_1$ a structuring element, would typically be a shape like a 3×3 or 5×5 square of pixels that would be determined for the particular marking process setpoints.

2. Dilate (or erode) K by some similar structuring element $B_2$ $K_D=(K \oplus B_2)$ 3. Generate an image mask that is needed to distinguish where to blur the edge $K_M=C_D \cap K_D$ 4. Generate the blurred final K separation using a convolution with low pass filter $B_3$ and a high frequency halftoning algorithm HT $K_{out}=HT\_HI\_FREQ[(K_D*B_3) \cap C_D \cup (K \Delta K_M)]$ 5. Generate dilated and masked output for cyan $C_{out}=C \cup K_M$ Note that many of the symbols used above are typically applied to a binary image. In the present case we use those familiar symbols to also denote equivalent operations on grayscale input images. Also note that the symbolic description above is one possible embodiment of the present invention. As with most logical and algorithmic processes, there may be many representations for the same overall process. The representation above was used here because it is a form that is preferred for teaching the method and also can be directly applied in the systems of interest. Further note that the approach shown above could be extended to also include halftoning the cyan and black separations (or any other color combination) with their respective halftone dot plus high frequency halftoning for the edge.

Figure 4:
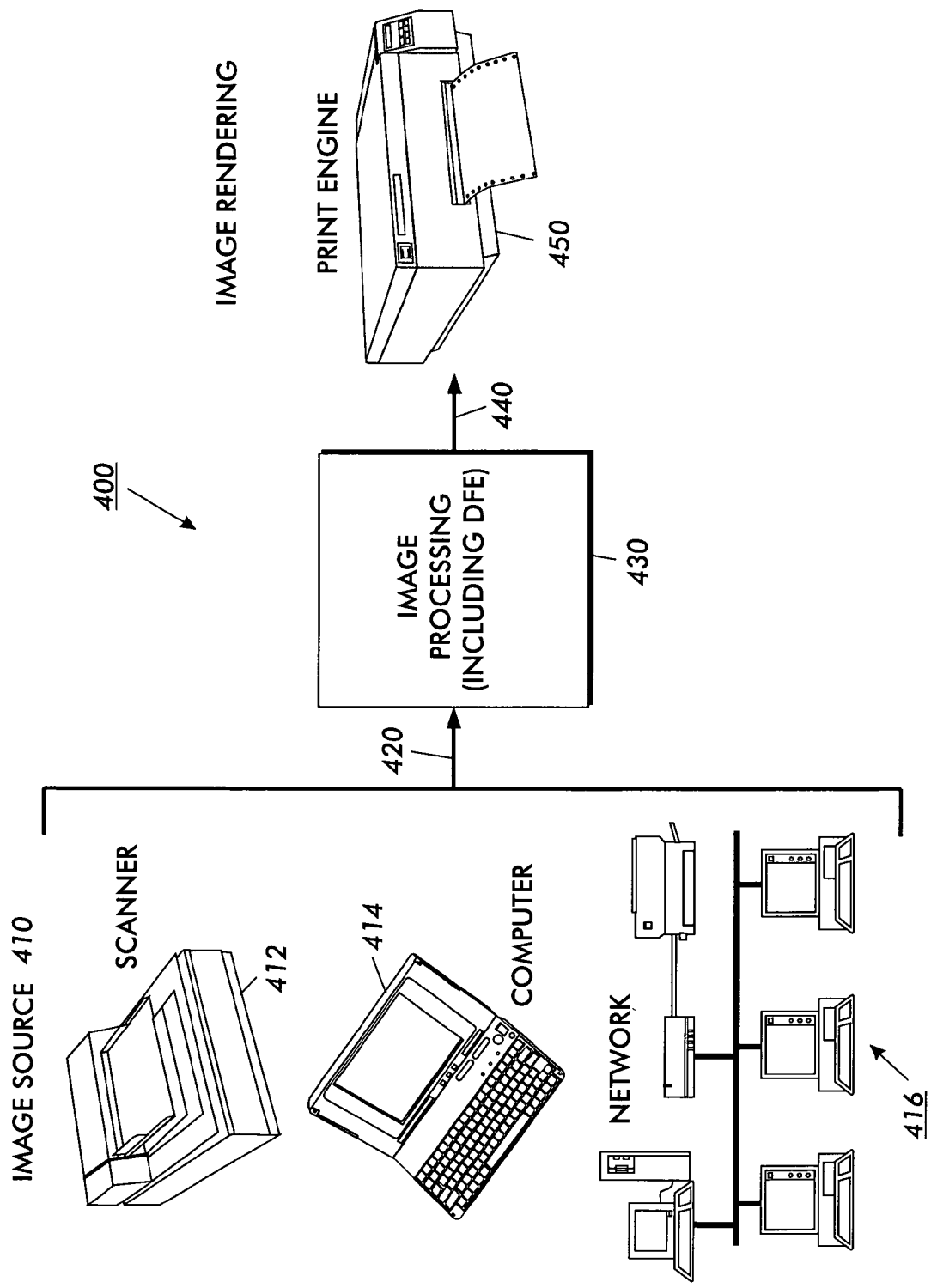
FIG. 4 is a general representation of a suitable system-level embodiment for the invention.

Turning now to FIG. 4, there is shown an embodiment of a digital imaging system 400 that incorporates the features of the present invention. Digital imaging system 400 includes image source 410 that may include scanner 412, computer 414, network 416 or any similar or equivalent image input terminal (IIT) to generate original input image data 420. Image data 420, representing an image to be printed, is supplied to an image processing system 430, that may incorporate what is known in the art as a digital front end (DFE). Image processing system 430 process the received original image data 420 to produce print ready binary data 440 that is supplied to print engine 450. In response to print ready data 440, print engine 450 generates an output document or print image on suitable media. Print engine 450 is preferably a electrostatographic or electrophotographic engine; however, engine 450 may include an equivalent alternative. The present invention is directed towards aspects of image processing system 430 depicted in FIG. 4. In particular, the present invention is directed to selective edge softening and selective dithering of shape edges in image data 420.

There are a variety of approaches apparent to those skilled in the art that may be taken in image processing system 430 for processing received original image data 420 so as to produce binary data 440 for selective edge softening. It will also be appreciated by those skilled in the art that the exact type and pattern of edge dithering utilized will vary depending upon the particulars of print engine 450. One approach comprises essentially the steps of storing the incoming data 420 in a buffer or memory; replicating or copying incoming data 420 in a memory work space; performing a selective dilation/erosion upon the work space data followed by; XOR of that result with another copy of the original incoming data 420, then; dithering that result, and; finally performing an XOR operation of that work space result upon the original incoming data 420 as stored in a buffer memory (or upon a copy of the original incoming data 420). This will place selectively dithered edges into the image to overcome halo problems.

An image description language such as PostScript™ will achieve the edge softening in much the same manner as described above, but will utilizing trapping. Trapping is a selective dilation typically used to ameliorate halo effects. However, here the trapping result is tagged for dithering or edge softening. That dithered and/or softened result is then substituted back into either a processed or an unprocessed version of the image. In one embodiment the result is substituted into the original image with an XOR operation after that original has received application of the system halftone. Please note that edge modification operations are often performed on image types other than digital pixelated images. For instance, edge trapping is often performed on a vector (functional, PDL, . . . ) form of an image. The present invention also applies in that setting. One such usage in that setting is an improvement over current trapping practices in the art. The improvement includes inserting a trap object (dilated edge) in functional or digital form, where the trap possesses values as described above [softened gradient, . . . ]. Further, a tag denoting that the object is a trap or denoting a preferred rendering process for the object may be created and adjoined to the electronic file describing the image. Subsequent digitization and rendering modules may then selectively render the trap objects according the tag information. In some Digital Front Ends (DFEs) one or more of the above processing modules may be combined into a single module.

Thus by introducing selective edge softening and edge selective edge dithering in combination with the methods and apparatus discussed above, better positioning of the toner cloud is afforded, color plane-to-plane interactions are overcome, and misregistration error is mitigated, thereby overcoming edge displacement, image halo, and slow toner problems.

While the embodiment disclosed herein is preferred, it will be appreciated from this teaching that other variations or examples may be made by those skilled in the art. There is no intent to exclude various alternative, modifications, variations or improvements from being encompassed by the following claims.

The invention claimed is:

1. A method for eliminating halo defects in a print image, comprising:
   receiving and storing print image data;
   selectively dilating a copy of the stored print image data to create an area of selective dilation; and,
   halftoning the area of selective dilation with a different halftone type than the halftone which is used by the system as applied to the rest of the image.

2. The method of claim 1, wherein the dilating step is applied only to an edge of a black region.

3. The method of claim 1, wherein the dilating step is applied to an edge of a color region.

4. The method of claim 1, wherein the dilating step is applied to an edge of a color region if there is a subsequent color to be developed.

5. The method of claim 1, wherein the dilating step is applied only to an edge perpendicular to a fast scan direction.

6. The method of claim 1, wherein the dilating step is applied only to an edge perpendicular to a slow scan direction.

7. The method of claim 1, further comprising the step of edge softening the area of selective dilation.

8. The method of claim 7, wherein the halftoning applied to the area of selective dilation is at a higher frequency than the halftoning applied to the rest of the image.

9. The method of claim 7, wherein the halftoning applied to the area of selective dilation is of a diffused type.

10. The method of claim 7, wherein the halftoning applied to the area of selective dilation is of a stochastic type.

* * * * *